United States Patent
Lai

(12) 
(10) Patent No.: US 6,388,228 B1
(45) Date of Patent: May 14, 2002

(54) STRUCTURE OF LASER SCULPTURING MACHINE

(75) Inventor: Jin-Sheng Lai, Hsi-Chih (TW)

(73) Assignee: Great Computer Corp., Taipei Hsien (TW)

( * ) Notice: Subject to any disclaimer, the term of this patent is extended or adjusted under 35 U.S.C. 154(b) by 0 days.

(21) Appl. No.: 09/740,835

(22) Filed: Dec. 21, 2000

(51) Int. Cl.⁷ ............................................... B23K 26/38
(52) U.S. Cl. ........................... 219/121.6; 219/121.67; 219/121.78
(58) Field of Search .................. 219/121.6, 121.78, 219/121.82, 121.84, 121.86, 121.67

(56) References Cited

U.S. PATENT DOCUMENTS

| | | | | |
|---|---|---|---|---|
| 4,985,780 A | * | 1/1991 | Garnier et al. | 219/121.78 |
| 5,051,558 A | * | 9/1991 | Sukhman | 219/121.78 |
| 5,906,760 A | * | 5/1999 | Robb et al. | 219/121.67 |

* cited by examiner

Primary Examiner—Geoffrey S. Evans
(74) Attorney, Agent, or Firm—Varndell & Varndell, PLLC

(57) ABSTRACT

Structure of laser sculpturing machine including an upper casing, a base seat, a transmission unit, a cutter seat, a focusing pin, an elevating mechanism, a controlling valve and a light beam guiding unit. The upper casing is mounted on the base seat. The transmission unit and the light beam guiding unit are disposed on the base seat. The transmission unit includes two motors for controlling the cutter seat which is movably mounted on a slide rail and moving the cutter seat to a desired position. The cutter seat is connected with the focusing pin. The elevating mechanism is disposed in the base seat. The sculpturing platform is mounted on the elevating mechanism. The sculpturing platform is formed with multiple vents. A dust-collecting chamber is formed under the sculpturing platform. Two heat-resistant crimped plates are oppositely disposed on two sides of the sculpturing platform to defme a collective and free air path for the powder, dust and smog produced in the laser processing operation. A valve controlling lever is disposed on the controlling valve for adjusting the opening position of a valve and controlling the air-sucking path. An auxiliary shielding board is added onto the sculpturing platform to enhance the sucking force and attract a light work piece.

3 Claims, 7 Drawing Sheets

STRUCTURE OF LASER SCULPTURING MACHINE

BACKGROUND OF THE INVENTION

The present invention relates to a structure of laser sculpturing machine in which by means of rotating a valve controlling lever of a controlling valve, the exhaustion path can be controlled. Two heat-resistant crimped plates are oppositely disposed on two sides of the sculpturing platform in the base seat. An auxiliary shielding board is added onto the sculpturing platform. Therefore, laser sculpturing machine of the present invention has excellent dust-collecting effect and strong work piece-fixing effect as well as extensible dustproof working area. The present invention is applicable to laser sculpturing machines and other similar devices.

There are various kinds of commercially available laser sculpturing machines. It is important to develop a better way to exhaust the powder, dust and smog produced in laser processing operation and fix the work piece.

A conventional laser sculpturing machine includes a frame body, a transmission mechanism disposed in the frame body, a working bench transversely movably mounted on front side of the frame body, a rotary chuck disposed on one side of the working bench, an original document tray disposed on the other side of the working bench, a sculpturing head disposed on rear side of the chuck, a photoelectric device disposed on rear side of the original document tray and a microcomputer connected with rear side of the frame body. The transmission mechanism via a motor and a belt drives a driving shaft which via a spiral rod/spiral wheel unit drives the chuck disc and original document tray to synchronously rotate on the working bench for sculpturing a work piece. In the laser sculpturing operation, the powder, dust and smog produced cannot be exhausted and the work piece can be hardly stably fixed.

SUMMARY OF THE INVENTION

It is therefore a primary object of the present invention to provide a structure of laser sculpturing machine in which by means of rotating a valve controlling lever of a controlling valve, the exhaustion path can be controlled. The powder, dust and smog produced in laser processing operation can be totally exhausted through the air-collecting opening on rear side of the working area or through the vents of the sculpturing platform out of the inner rear dust-collecting pipeline of the machine. Alternatively, the powder, dust and smog produced in laser processing operation can be at the same time exhausted through the air-collecting opening on rear side of the working area and through the vents of the sculpturing platform. Therefore, the present invention is able to achieve excellent dust-collecting effect and strongly fix the work piece.

It is a further object of the present invention to provide the above structure of laser sculpturing machine in which when the sculpturing platform is ascended or descended, the heat-resistant crimped plates on two sides of the working area can be extended or collapsed to form isolating faces on two sides and define a collective and free air path for the powder, dust and smog produced in the laser processing operation.

It is still a further object of the present invention to provide the above structure of laser sculpturing machine in which in accordance with the configuration of the work piece, an auxiliary shielding board can be added onto the sculpturing platform for shielding the work piece from the vents outside the periphery of the work piece, while the vents inside the periphery of the work piece remain to enhance the sucking force. In addition, the vents can attract lighter work piece.

According to the above objects, the structure of laser sculpturing machine of the present invention includes an upper casing, a base seat, a transmission unit, a cutter seat, a focusing pin, an elevating mechanism, a controlling valve and a light beam guiding unit. The upper casing is mounted on the base seat. The transmission unit and the light beam guiding unit are disposed on the base seat. The transmission unit includes two motors for controlling the cutter seat which is movably mounted on a slide rail and moving the cutter seat to a desired position. The cutter seat is connected with the focusing pin. The elevating mechanism is disposed in the base seat. The sculpturing platform is mounted on the elevating mechanism. The sculpturing platform is formed with multiple vents. A dust-collecting chamber is formed under the sculpturing platform. Two heat-resistant crimped plates are oppositely disposed on two sides of the sculpturing platform to defme a collective and free air path for the powder, dust and smog produced in the laser processing operation. A valve controlling lever is disposed on the controlling valve for adjusting the opening position of a valve and controlling the air-sucking path. An auxiliary shielding board is added onto the sculpturing platform to enhance the sucking force and attract a light work piece.

The present invention can be best understood through the following description and accompanying drawings wherein:

DETAILED DESCRIPTION OF THE PREFERRED EMBODIMENTS

Figure 1:
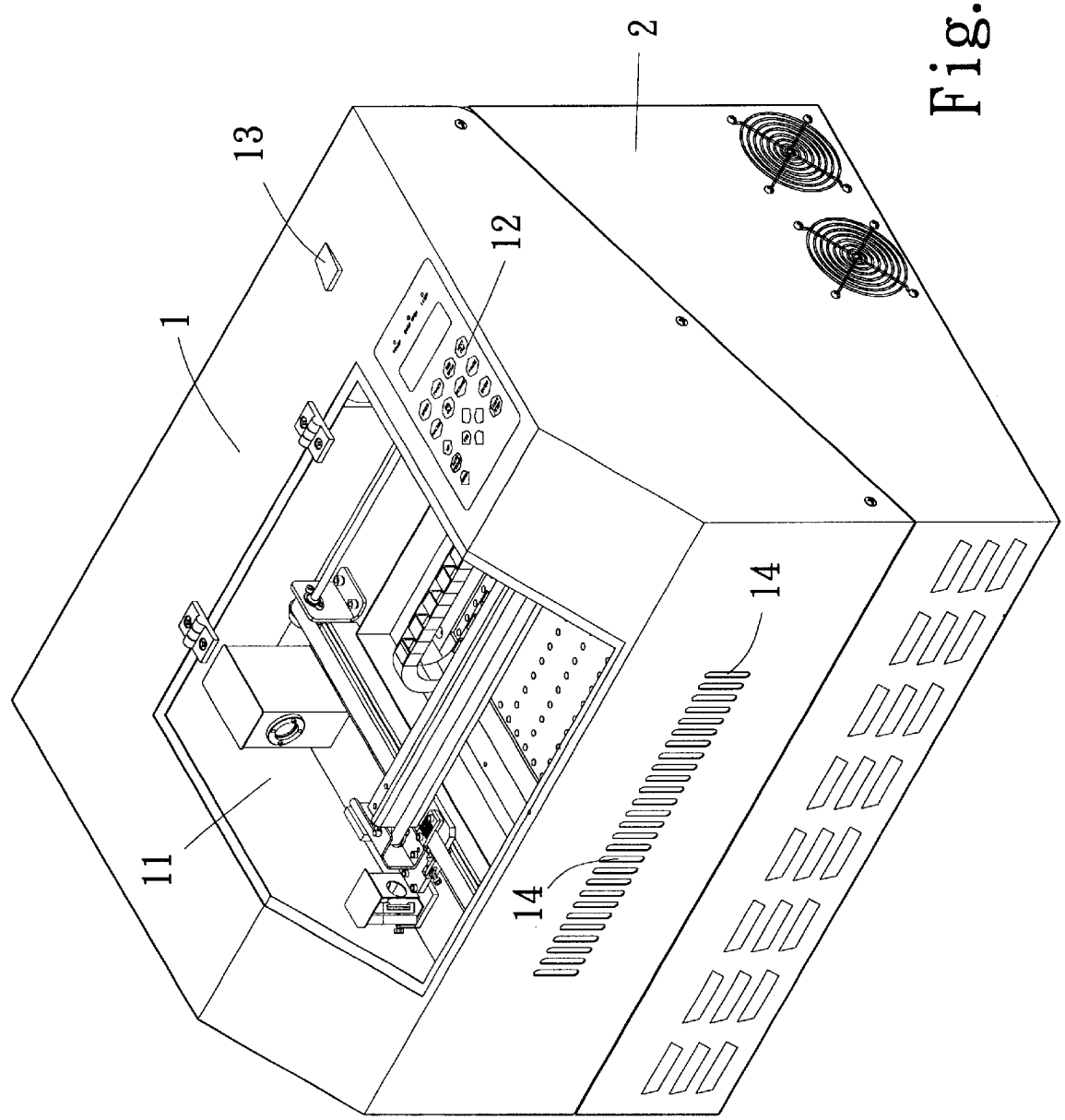
FIG. 1 is a front perspective view of the present invention.
Figure 2:
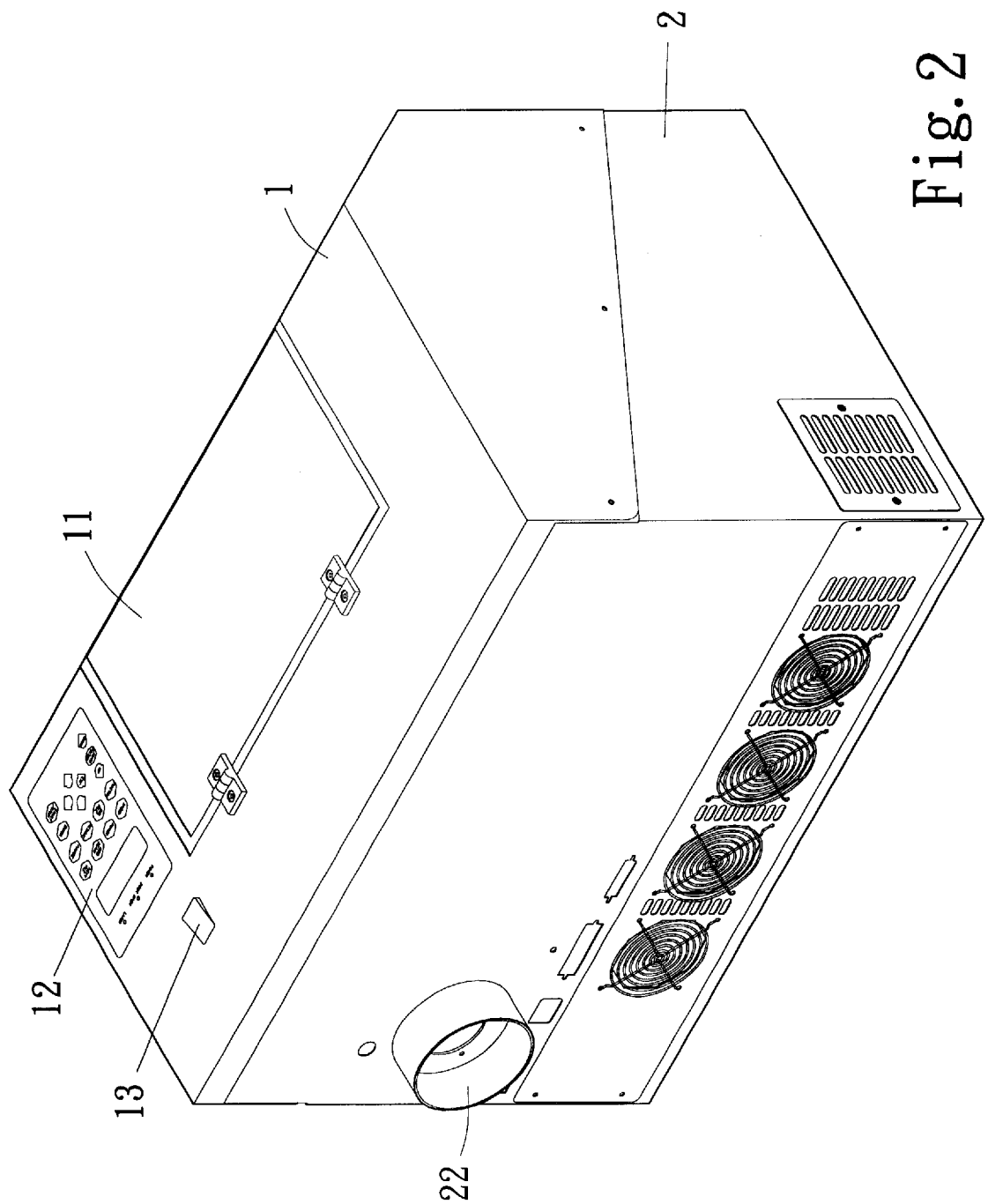
FIG. 2 is a rear perspective view of the present invention.
Figure 3:
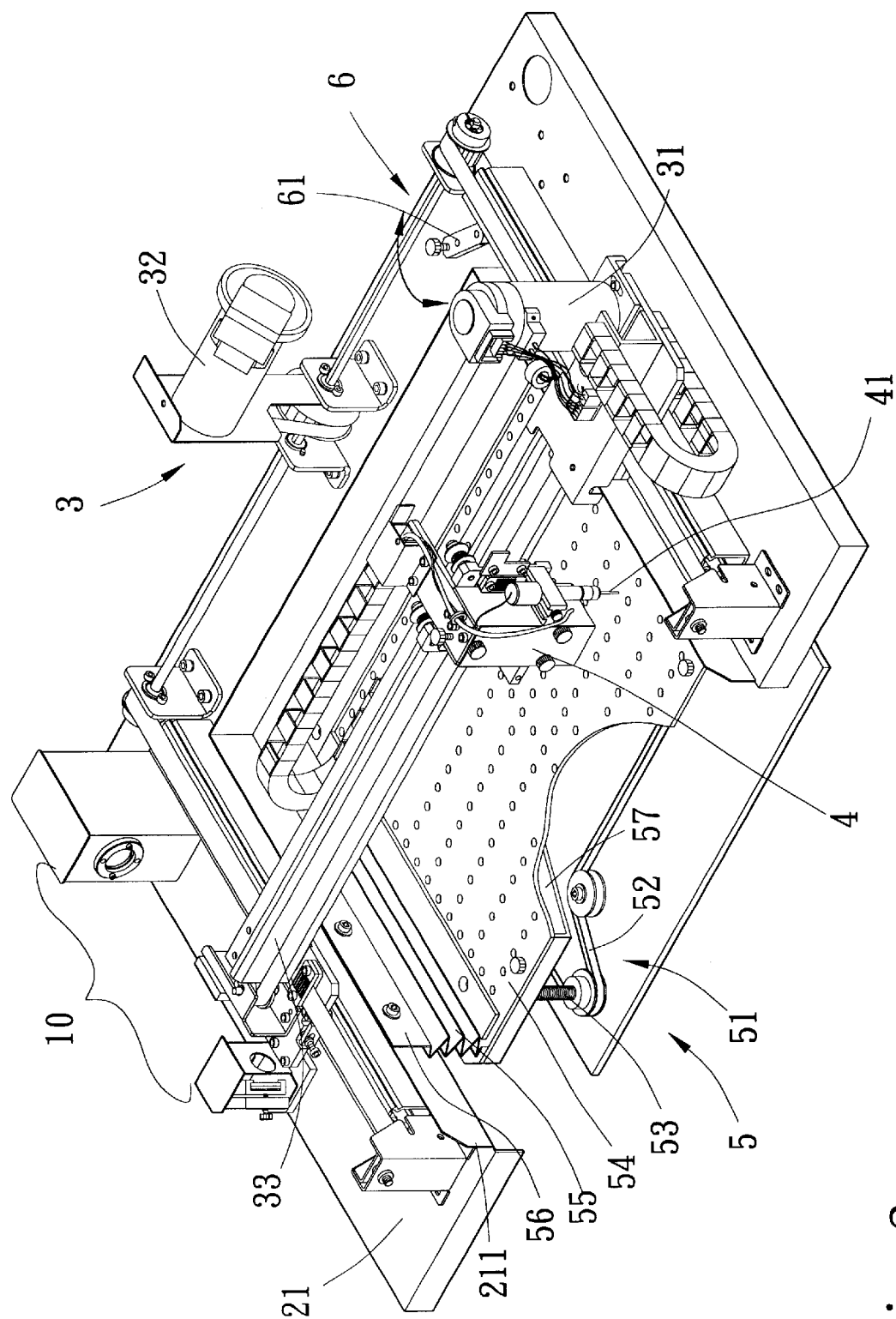
FIG. 3 is a perspective view showing the internal structure of the present invention.

Please refer to FIGS. 1, 2 and 3. The laser sculpturing machine of the present invention includes an upper casing 1, a base seat 2, a transmission unit 3, a cutter seat 4, a focusing pin 41, an elevating mechanism 5, a controlling valve 6 and a light beam guiding unit 10.

A computer control panel 12 is mounted on the upper casing 1. A switch 13 is disposed on top face of the upper casing 1. A transparent cover 11 is connected with the upper casing 1. Multiple inlets 14 are formed on front side of the upper casing 1.

Two lateral sides and rear side of the base seat 2 are formed with reverse U-shaped support platforms 21. The transmission unit 3 and the light beam guiding unit 10 are mounted on the support platforms 21. An upright side wall 211 upward extends from inner edge of each support platform 21. The rear side of the base seat 2 is formed with an outlet 22 at which an exhaustion device is connected.

The transmission unit 3 includes two motors 31, 32 for controlling the cutter seat 4 which is movably mounted on a slide rail 33 and moving the cutter seat 4 to a desired position. The cutter seat 4 is connected with the focusing pin 41.

The elevating mechanism 5 includes a set of guide rollers 51 disposed on a recessed bottom face of the base seat 2. A belt 52 is wound on the rollers 51. Thread rods 53 are respectively movably screwed with the guide rollers 51 on four corners. The thread rods 53 are fixed on bottom face of a sculpturing platform 54 formed with multiple vents 541. Two heat-resistant crimped plates 55 are oppositely disposed on two sides of the sculpturing platform 54. One end of each of the crimped plates 55 is locked between the side wall 211 of the base seat 2 and a fixing plate 56. The other end thereof is fixed on one side of top face of the sculpturing platform 54. A dust-collecting chamber 57 is disposed under the sculpturing platform 54.

The controlling valve 6 is positioned under the rear side of the base seat 2. A valve controlling lever 61 is disposed on the controlling valve 6 for adjusting the opening position of a valve.

Figure 4A:
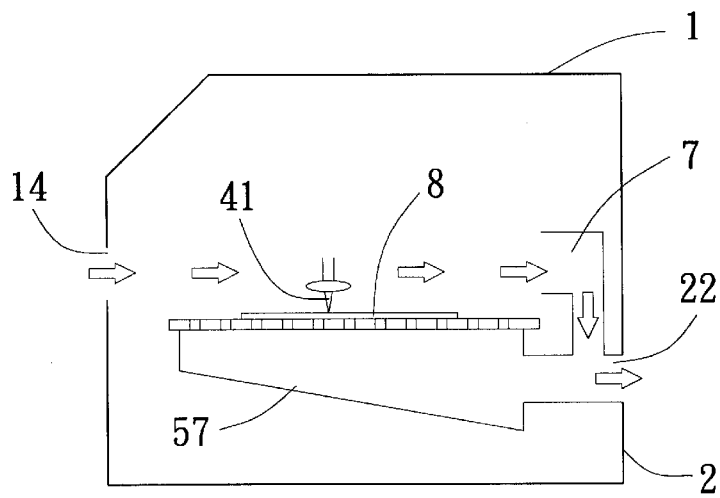
FIGS. 4a, 4b, 4c are sectional view showing that the valve controlling lever is switched to control the air-sucking path.
Figure 4B:
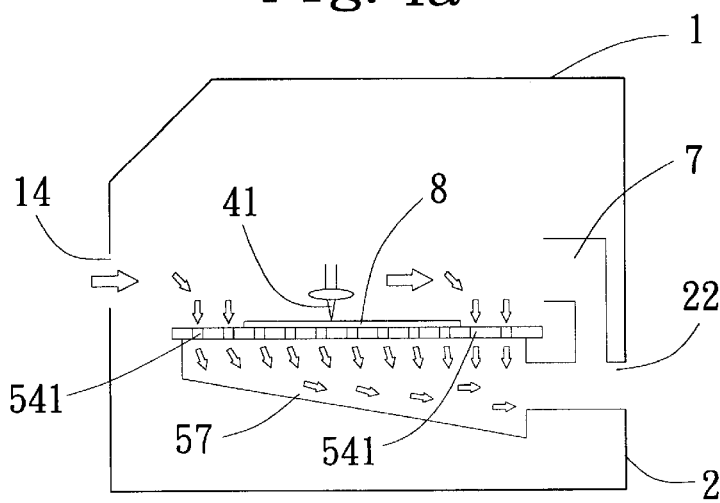
Figure 4C:
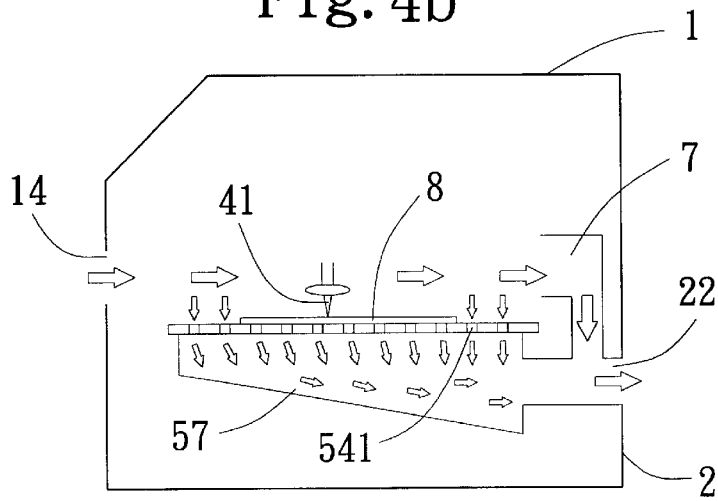
Figure 5A:
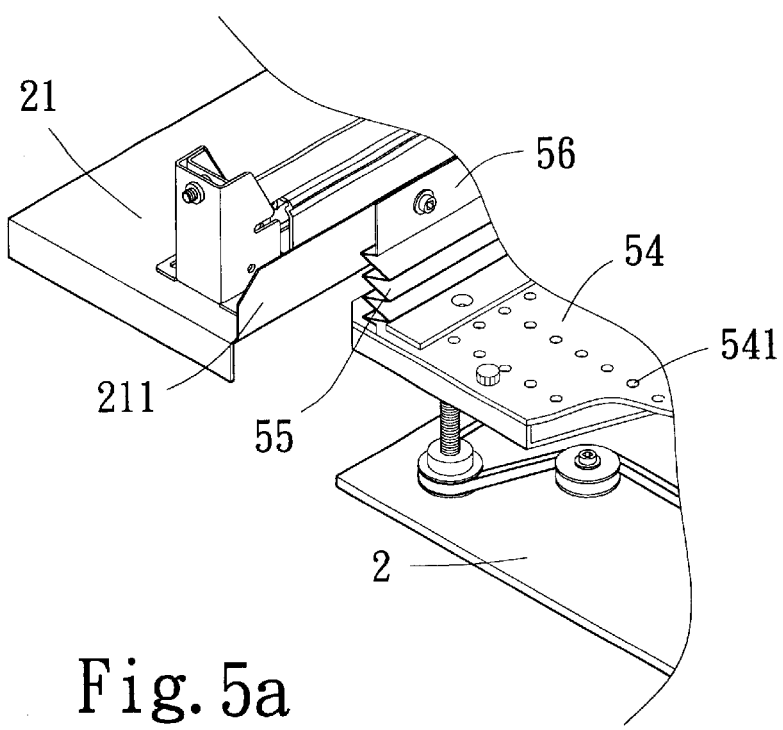
FIGS. 5a and 5b show the connection and operation of the sculpturing platform, crimped plate, fixing plate and elevating mechanism of the present invention.
Figure 5B:
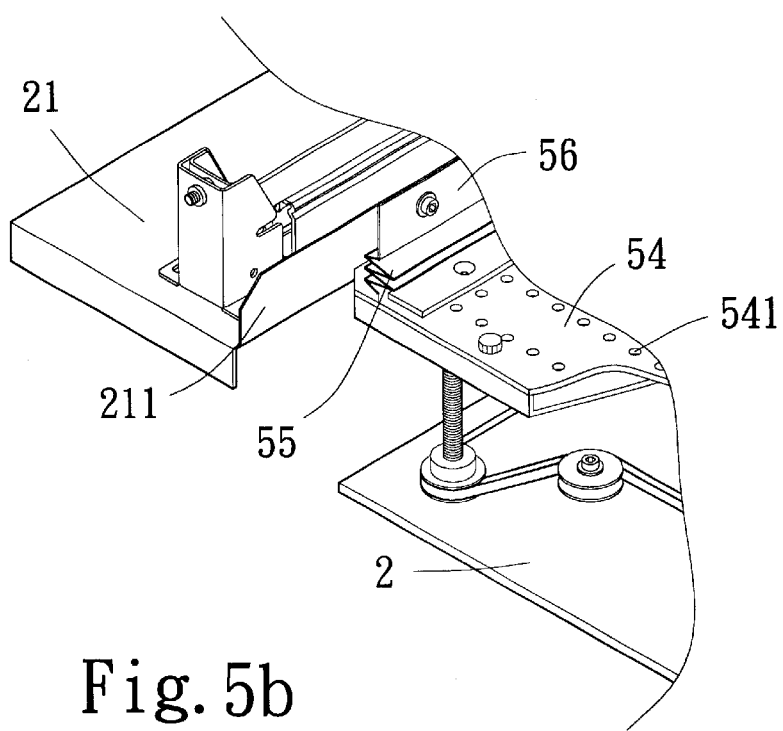

Please refer to FIGS. 1 to 4c. By means of rotating the valve controlling lever 61, the exhaustion manner can be controlled. Referring to FIG. 4a, the air gets into the machine through the inlets 14 of front side of the upper casing 1. The powder, dust and smog produced in laser processing operation can be totally exhausted out of an inner rear dust-collecting pipeline of the machine by an air-collecting opening 7 on rear side of the working area. Referring to FIG. 4b, by means of switching the valve, alternatively, the powder, dust and smog produced in laser processing operation can be totally exhausted through the vents 541 of the sculpturing platform 54 from the dust-collecting chamber 57 under the sculpturing platform 54 and the inner rear dust-collecting pipeline of the machine. Referring to FIG. 4c, by means of rotating the valve controlling lever 61 to a certain position, alternatively, the powder, dust and smog produced in laser processing operation can be at the same time exhausted through the air-collecting opening 7 on rear side of the working area and through the vents 541 of the sculpturing platform 54 out of the inner rear dust-collecting pipeline of the machine. In addition, the vents 541 can attract lighter work piece. Referring to FIGS. 5a and 5b, when the sculpturing platform 54 is ascended or descended, the heat-resistant crimped plates 55 on two sides of the working area can be extended or collapsed to form isolating faces on two sides and define a collective and free air path for the powder, dust and smog produced in the laser processing operation. Moreover, in accordance with the configuration of the work piece, an auxiliary shielding board 9 can be added onto the sculpturing platform 54 for shielding the work piece from the vents 541 outside the periphery of the work piece, while the vents 541 inside the periphery of the work piece remain to enhance the sucking force. Accordingly, the present invention is able to achieve excellent dust-collecting effect and strong work piece-fixing effect as well as extensible dustproof working area.

Figure 6:
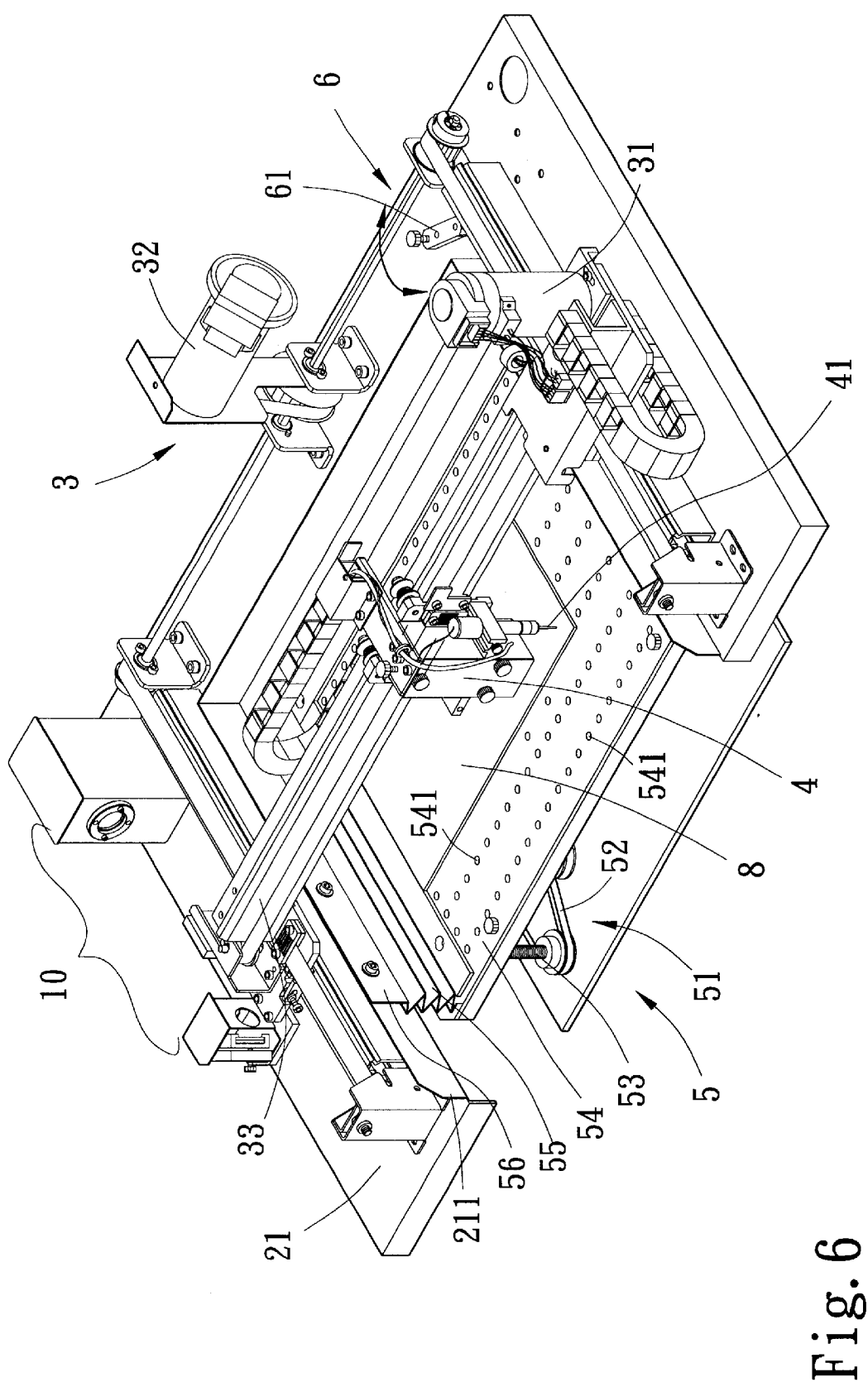
FIG. 6 shows the use of the present invention in one state.
Figure 7:
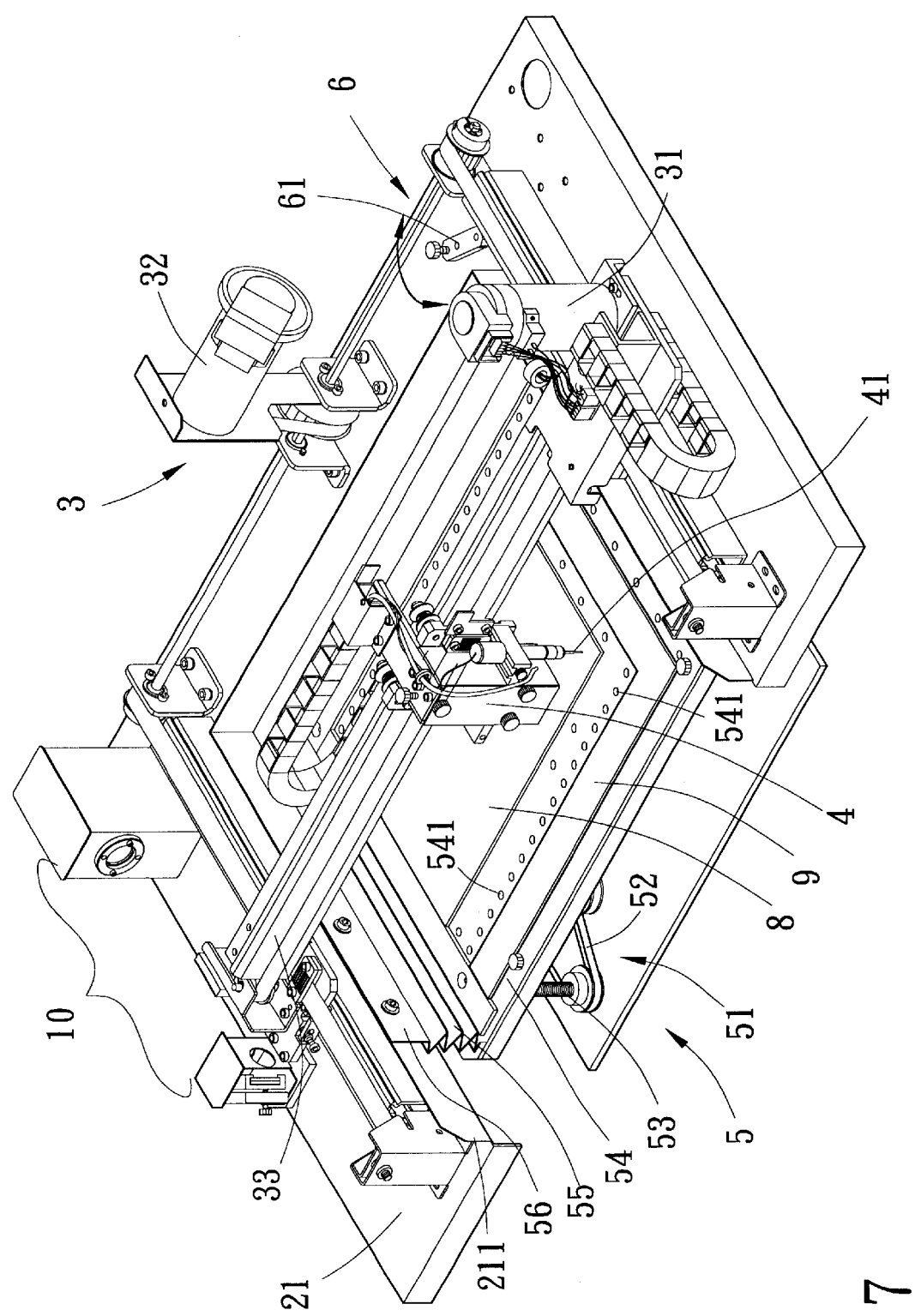
FIG. 7 shows the use of the present invention in another state.

Referring to FIG. 6, in use, the work piece 8 is placed on the sculpturing platform 54. By means of rotating the valve controlling lever 61, the exhaustion manner can be controlled. The powder, dust and smog produced in laser processing operation can be exhausted through the air-collecting opening 7 on rear side of the working area or through the vents 541 of the sculpturing platform 54 out of the inner rear dust-collecting pipeline of the machine. Alternatively, the powder, dust and smog produced in laser processing operation can be at the same time exhausted through the air-collecting opening 7 on rear side of the working area and through the vents 541 of the sculpturing platform 54. Referring to FIG. 7, the auxiliary shielding board 9 can be added onto the sculpturing platform 54 for shielding the work piece from the vents 541 outside the periphery of the work piece, while the vents 541 inside the periphery of the work piece remain to enhance the sucking force.

The present invention has the following advantages:

1. By means of switching the valve, the exhaustion manner can be controlled. The powder, dust and smog produced in laser processing operation can be totally exhausted through the air-collecting opening on rear side of the working area or through the vents of the sculpturing platform out of the inner rear dust-collecting pipeline of the machine. Alternatively, the powder, dust and smog produced in laser processing operation can be at the same time exhausted through the air-collecting opening on rear side of the working area and through the vents of the sculpturing platform. Therefore, the present invention is able to achieve excellent dust-collecting effect and strongly fix the work piece.

2. When the sculpturing platform is ascended or descended, the heat-resistant crimped plates on two sides of the working area can be extended or collapsed to form isolating faces on two sides and define a collective and free air path for the powder, dust and smog produced in the laser processing operation.

3. In accordance with the configuration of the work piece, an auxiliary shielding board can be added onto the sculpturing platform for shielding the work piece from the vents outside the periphery of the work piece, while the vents inside the periphery of the work piece remain to enhance the sucking force. In addition, the vents can attract lighter work piece.

The above embodiments are only used to illustrate the present invention, not intended to limit the scope thereof. Many modifications of the above embodiments can be made without departing from the spirit of the present invention.

What is claimed is:

1. A laser sculpturing machine comprising an upper casing, a base seat, a transmission unit, a cutter seat, a focusing pin, an elevating mechanism, a controlling valve and a light beam guiding unit, wherein the upper casing is mounted on the base seat, the transmission unit and the light beam guiding unit being disposed on the base seat, transmission unit including two motors for controlling the cutter seat which is movably mounted on a slide rail and moving the cutter seat to a desired position, the cutter seat being connected with the focusing pin, the elevating mechanism being disposed in the base seat, a sculpturing platform being mounted on the elevating mechanism, the sculpturing platform being formed with multiple vents, a dust-collecting chamber being formed under the sculpturing platform, said laser sculpturing machine being characterized in that:

two heat-resistant crimped plates are oppositely disposed on two sides of the sculpturing platform. one end of each of the crimped plates being locked with the base seat, the other end thereof being fixed on one side of the sculpturing platform; and the controlling valve is positioned under a rear side of the base seat, a valve controlling lever being disposed on the controlling valve for adjusting the opening position of a valve and controlling the air-sucking path.

2. A laser sculpturing machine as claimed in claim 1, wherein one end of each of the crimped plates is locked between a side wall of inner edge of a support platform of the base seat and a fixing plate and the other end thereof is fixed on one side of top face of the sculpturing platform.

3. A of laser sculpturing machine as claimed in claim 1, wherein in accordance with the configuration of a work piece, an auxiliary shielding board is added onto the sculpturing platform around the work piece for shielding the work piece from the vents outside the periphery of the work piece, while the vents inside the periphery of the work piece remain to enhance the sucking force and attract a light work piece.

* * * * *